United States Patent
Tao et al.

(10) Patent No.: US 8,585,336 B2
(45) Date of Patent: Nov. 19, 2013

(54) FASTENER

(75) Inventors: Tao Tao, KunShan (CN); Bo Hong, KunShan (CN)

(73) Assignees: Furui Precise Component (Kunshan) Co., Ltd., Kunshan (CN); Foxconn Technology Co., Ltd., New Taipei (TW)

( * ) Notice: Subject to any disclaimer, the term of this patent is extended or adjusted under 35 U.S.C. 154(b) by 77 days.

(21) Appl. No.: 13/308,551

(22) Filed: Dec. 1, 2011

(65) Prior Publication Data

US 2013/0045062 A1 Feb. 21, 2013

(30) Foreign Application Priority Data

Aug. 18, 2011 (CN) .......................... 2011 1 0237663

(51) Int. Cl.
*F16B 21/00* (2006.01)
(52) U.S. Cl.
USPC .......................................... 411/347; 411/107
(58) Field of Classification Search
USPC .................................. 411/347, 349
See application file for complete search history.

(56) References Cited

U.S. PATENT DOCUMENTS

| | | | | |
|---|---|---|---|---|
| 3,114,405 | A * | 12/1963 | Tait et al. | 411/349 |
| 4,720,223 | A * | 1/1988 | Neights et al. | 411/11 |
| 5,336,028 | A * | 8/1994 | Yamamoto | 411/107 |
| 6,468,011 | B2 * | 10/2002 | Mayer | 411/353 |
| 6,761,521 | B2 | 7/2004 | McCormack | |
| 7,641,431 | B2 * | 1/2010 | Luo et al. | 411/353 |
| 2003/0175091 | A1 * | 9/2003 | Aukzemas et al. | 411/107 |

FOREIGN PATENT DOCUMENTS

CN 2869421 2/2007

* cited by examiner

*Primary Examiner* — Gary Estremsky
(74) *Attorney, Agent, or Firm* — Wei Te Chung; Ming Chieh Chang

(57) ABSTRACT

A fastener includes a bolt, a ring engaged around the bolt, and a coil spring. The bolt includes a head, a threaded engaging portion, a shaft portion between the head and the threaded engaging portion, and a bottom flange extending radially and outwards from an end of the shaft portion connecting the threaded engaging portion. The shaft portion includes a main part connecting the head, a tail part connecting the bottom flange, and a guiding part connecting the main part and the tail part. A diameter of tail part is smaller than a diameter of the main part. A diameter of the guiding part increases from the tail part to the main part along an axial direction of the bolt. The coil spring coils the shaft portion and is sandwiched between the head of the bolt and the ring.

10 Claims, 4 Drawing Sheets

FASTENER

BACKGROUND

1. Technical Field

The present disclosure relates to a fastener.

2. Description of the Related Art

A thermal module is usually mounted on an electronic component for dissipating heat, and fasteners are provided for securing the thermal module onto the electronic component. Generally each fastener includes a bolt defining an annular groove near a bottom thereof, a spring disposed around the top of the bolt, and a ring snapped into the groove to prevent a slide of the spring. Thereby, the spring can be pre-assembled to the bolt.

However, during the pre-assembling process, a bottom end of the spring may be mistakenly snapped into the groove and can not leave from the groove. When this erroneous mounting happens, the spring may be out of work, and the fastener may not be useable to fix the thermal module.

It is thus desirable to provide a fastener which can overcome the described limitations.

DETAILED DESCRIPTION

Figure 1:
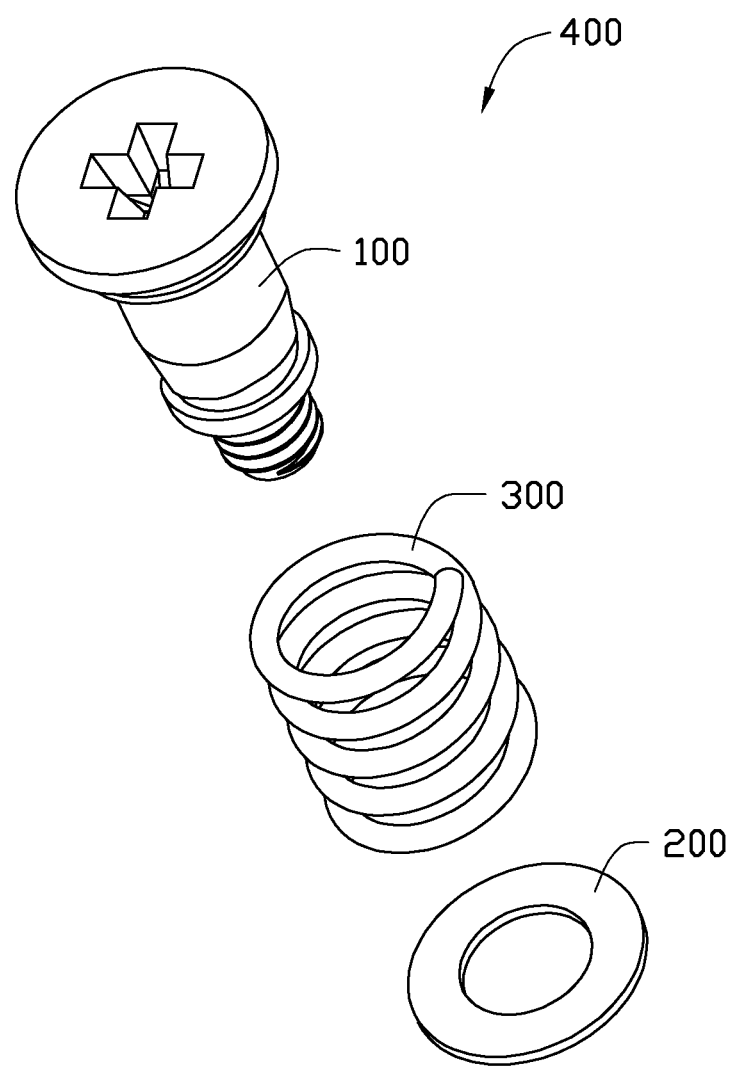
FIG. 1 is an exploded view of a fastener according to an embodiment of the present disclosure.

Reference will now be made to the drawing figures to describe in detail various embodiments of the present fastener.

Figure 2:
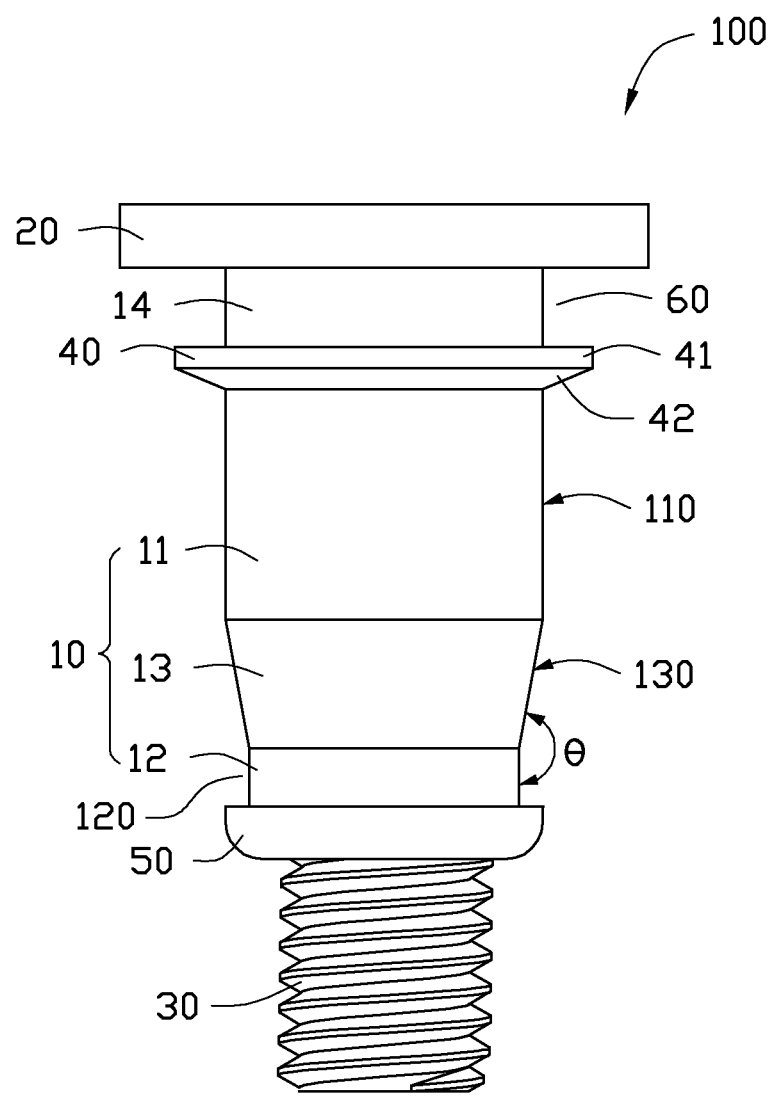
FIG. 2 is a front plan view of a bolt of the fastener of FIG. 1.

FIGS. 1 and 2 schematically show a fastener 400 according to an exemplary embodiment. The fastener 400 includes a bolt 100, a ring 200 engaged with the bolt 100, and a coil spring 300 coiling the bolt 100 and resisting against the ring 200.

The bolt 100 includes a head 20 at one end thereof, a threaded engaging portion 30 at an opposite end of the bolt 100, and a smooth shaft portion 10 between the head 20 and the threaded engaging portion 30. A protruding flange 40 extends radially and outwards from a top end of the shaft portion 10 near the head 20. A bottom flange 50 extends radially and outwards from a bottom end of the shaft portion 10 near the threaded engaging portion 30. An outer diameter of the shaft portion 10 is smaller than a diameter the head 20, but larger than a diameter of the threaded engaging portion 30.

The head 20 has a circular plate configuration. A space 60 exists between the protruding flange 40 and the head 20. The part of the shaft portion 10 at the space 60 acts as a neck 14. The protruding flange 40 includes an annular column side surface 41 parallel to an outer surface 110 of the shaft portion 10, and a tapered annular side surface 42 extending downwardly and slantwise from the side surface 41 to connect the outer surface 110 of the shaft portion 10. The threaded engaging portion 30 forms a plurality of screw threads at an outer cylindrical surface thereof.

The shaft portion 10 includes a main part 11 connecting the protruding flange 40, a tail part 12 connecting the bottom flange 50, and a guiding part 13 connecting the main part 11 and the tail part 12. A diameter of the main part 11 is larger than a diameter of the tail part 12, and substantially equaling to a diameter of the bottom flange 50. The guiding part 13 has a tapered annular side surface 130 extending downwardly and slantwise from the main part 11 to connect the tail part 12. The annular side surface 130 is smooth. A length of the guiding part 13 is larger than that of the tail part 12. A recess 120 is defined around the tail part 12 and between the guiding part 13 and the bottom flange 50. An obtuse angle θ is defined between the side surface 130 of the guiding part 13 and a surface of the tail part 12. The angle θ is larger than 135 degree. In this embodiment, the angle θ is 155 degree.

Figure 3:
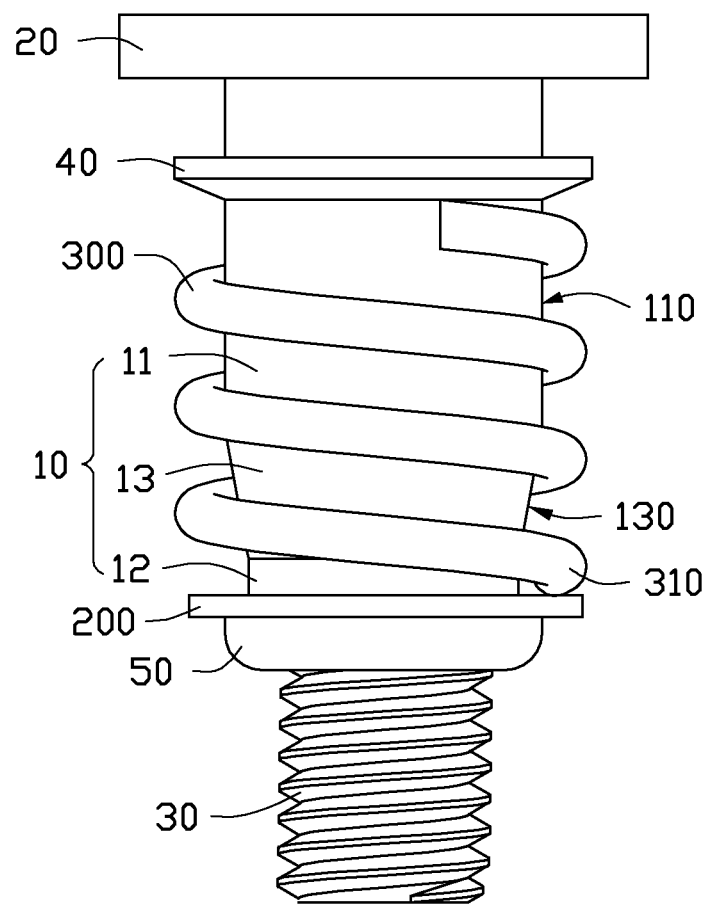
FIG. 3 is an assembled, front plan view of the fastener of FIG. 1.
Figure 4:
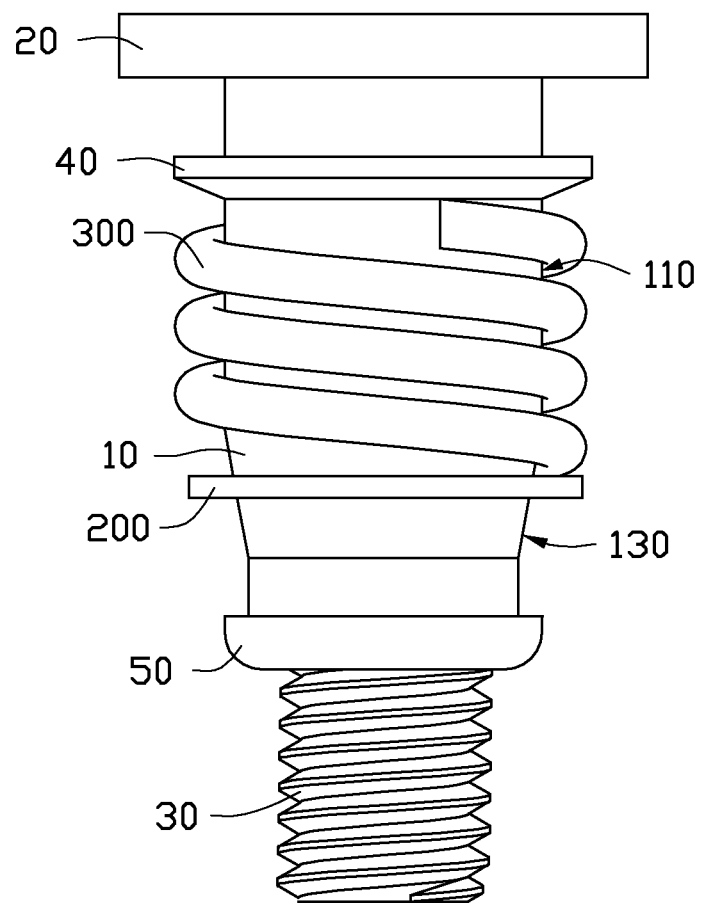
FIG. 4 is similar to FIG. 3, but showing the fastener in a different state.

Referring to FIGS. 3 and 4, after the coil spring 300 coils around the shaft portion 10, the ring 200 is in the recess 120 of the shaft portion 10 to resist against the bottom flange 50 and a bottom end 310 of the spring 300. The ring 200 has an inner diameter slightly smaller than the diameter of the main part 11 and the diameter of the bottom flange 50, and has an outer diameter substantially the same as that of the spring 300. Opposite ends of the spring 300 resists against the protruding flange 40 and the ring 200. In use, the ring 200 is pushed upwards by outer object to press the spring 300 along an axial diameter of the bolt 100. The bottom end 310 of the spring 300 is pressed to move upwards from the recess 120 to an outer surface of the shaft portion 10. Since the annular side surface 130 extends downwardly and slantwise from the main part 11 to connect with the tail part 12, the spring 300 can be unobstructed to move on the shaft portion 10 and will not be blocked in the recess 120.

It is to be further understood that even though numerous characteristics and advantages have been set forth in the foregoing description of the embodiment(s), together with details of the structures and functions of the embodiment(s), the disclosure is illustrative only; and that changes may be made in detail, especially in the matters of shape, size, and arrangement of parts within the principles of the disclosure to the full extent indicated by the broad general meaning of the terms in which the appended claims are expressed.

What is claimed is:

1. A fastener, comprising:
   a bolt comprising a head, a threaded engaging portion, a shaft portion between the head and the threaded engaging portion, a bottom flange extending radially and outwards from an end of the shaft portion connecting the threaded engaging portion, and a protruding flange extending radially and outwards from the shaft portion and near the head, the shaft portion comprising a main part connecting the head, a tail part connecting the bottom flange, and a guiding part connecting the main part and the tail part, a diameter of tail part being smaller than a diameter of the main part, diameters of the guiding part increasing from the tail part to the main part along an axial direction of the bolt;
   a ring engaged around the bolt; and
   a coil spring coiling the shaft portion and sandwiched between the head of the bolt and the ring, an end of the coil spring abutting the protruding flange.

2. The fastener of claim 1, wherein the guiding part has a tapered, smooth annular side surface extending downwardly and slantwise from the main part to connect with the tail part.

3. The fastener of claim 2, wherein an obtuse angle is defined between the side surface of the guiding part and a surface of the tail part and larger than 135 degree.

4. The fastener of claim 1, wherein the protruding flange has an annular side surface parallel to an outer surface of the shaft portion, and a tapered annular side surface extending downwardly and slantwise from the annular side surface to connect with the outer surface of the shaft portion.

5. The fastener of claim 1, wherein the ring is beneath the main part of the shaft portion.

6. A fastener, comprising:

a bolt comprising a head, a threaded engaging portion, a shaft portion connected with the head and the threaded engaging portion, a bottom flange extending radially and outwards from an end of the shaft portion near the threaded engaging portion, and a protruding flange extending radially and outwards from the shaft portion and near the head, the shaft portion comprising a middle guiding part, a diameter of the guiding part of the shaft portion gradually decreases from a larger end that is adjacent to the head to a small end that is adjacent to the bottom flange, the shaft portion at a space between the guiding part and the bottom flange defines a recess;

a ring engaged in the recess of the shaft portion; and a coil spring coiling the shaft portion and sandwiched between the head of the bolt and the ring, the coil spring having an end resisting against the ring and an opposite end abutting the protruding flange; wherein the end of the coil spring is smoothly movable relative to the bolt between an original state in which the end of the coil spring coils in the recess of the shaft portion, and an compressed state in which the end of the coil spring is pressed by the ring to withdraw from the recess and coils the guiding part of the shaft portion.

7. The fastener of claim 6, wherein the guiding part has a tapered, smooth annular side surface extending downwardly and slantwise from the larger end to the small end.

8. The fastener of claim 7, wherein an obtuse angle is defined between the side surface of the guiding part and an outer surface in the recess and larger than 150 degrees.

9. The fastener of claim 6, wherein the protruding flange has an annular side surface parallel to an outer surface of the shaft portion, and a tapered annular side surface extending downwardly and slantwise from the annular side surface to connect with the outer surface of the shaft portion.

10. A fastener, comprising:

a bolt comprising a head, a threaded engaging portion, a shaft portion between the head and the threaded engaging portion, and a protruding flange extending radially and outwards from the shaft portion and near the head, an annular recess being defined in the shaft portion at an end thereof connecting the threaded engaging portion, the end of the shaft portion correspondingly forming a tail part and a guiding part, the tail part connecting the threaded engaging portion and having an outer diameter less that that of other portion of shaft portion, the guiding part extending and expanding from the tail part towards the head;

a ring engaged in the recess of the shaft portion of the bolt; and a coil spring coiling the shaft portion of the bolt with one end abutting the ring, an end of the coil spring abutting the protruding flange.

\* \* \* \* \*